(12) United States Patent
Cairns et al.

(10) Patent No.: US 7,711,035 B2
(45) Date of Patent: May 4, 2010

(54) METHOD AND APPARATUS FOR SUPPRESSING COMMUNICATION SIGNAL INTERFERENCE

(75) Inventors: Douglas A. Cairns, Durham, NC (US); Leonid Krasny, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1391 days.

(21) Appl. No.: 10/943,274

(22) Filed: Sep. 17, 2004

(65) Prior Publication Data

US 2006/0072485 A1    Apr. 6, 2006

(51) Int. Cl.
*H04B 1/00* (2006.01)
(52) U.S. Cl. .................. 375/148; 375/130; 375/152; 375/143; 375/343; 375/346; 375/348; 370/342; 370/335
(58) Field of Classification Search .......... 375/148, 375/130, 152, 143, 343, 346, 348; 370/342, 370/335
See application file for complete search history.

(56) References Cited

U.S. PATENT DOCUMENTS

| | | | |
|---|---|---|---|
| 6,252,918 | B1 | 6/2001 | Bottomley et al. |
| 6,515,980 | B1 | 2/2003 | Bottomley |
| 6,603,827 | B2 | 8/2003 | Bottomley et al. |
| 6,650,716 | B1 | 11/2003 | Ratnarajah |
| 6,683,924 | B1 | 1/2004 | Ottosson et al. |
| 6,771,690 | B2 | 8/2004 | Heikkila |
| 2001/0033614 | A1 | 10/2001 | Hudson |
| 2002/0080863 | A1 | 6/2002 | Nielsen |
| 2002/0126741 | A1 | 9/2002 | Baum et al. |
| 2003/0108117 | A1* | 6/2003 | Ketchum et al. ............ 375/295 |

(Continued)

FOREIGN PATENT DOCUMENTS

EP        0 980 149        2/2000

(Continued)

OTHER PUBLICATIONS

Borran, Mohammad Jaber et al. "Channel Estimation and Signal Detection for Multi-Carrier CDMA Systems with Pulse-Shaping Filter." IEEE International Conference on Communications; Anchorage, Alaska, May 2003; vol. 5, pp. 3457-3461.

(Continued)

*Primary Examiner*—Mohammad H Ghayour
*Assistant Examiner*—Zewdu Kassa
(74) *Attorney, Agent, or Firm*—Coats & Bennett P.L.L.C.

(57) ABSTRACT

A frequency domain representation of a whitening filter is made to depend on essentially one unknown, namely, a scaling factor that is based on an estimated ratio of total base station power to the power spectral density (PSD) of inter-cell interference plus noise. In turn, that scaling factor can be computed based on the modeling terms used in a parametric model of the impairment correlations for a received communication signal. Preferably, the model comprises an interference impairment term scaled by a first model fitting parameter, and a noise impairment term scaled by a second model fitting parameter. Further, the scaling factor can be computed by directly estimating total base station transmit power and the PSD of inter-cell interference plus noise. In any case, the whitening filter can be used in whitening a received communication signal in conjunction with channel equalization processing or RAKE receiver processing, for example.

27 Claims, 6 Drawing Sheets

U.S. PATENT DOCUMENTS

| | | | |
|---|---|---|---|
| 2003/0235238 A1* | 12/2003 | Schelm et al. | 375/148 |
| 2004/0028155 A1 | 2/2004 | Dornstetter et al. | |
| 2004/0125863 A1 | 6/2004 | Ghosh | |
| 2005/0094713 A1* | 5/2005 | Yellin | 375/148 |

FOREIGN PATENT DOCUMENTS

| | | |
|---|---|---|
| EP | 1 119 146 | 7/2001 |
| EP | 1289182 A | 3/2003 |
| EP | 1 022 862 | 10/2003 |
| EP | 1371146 A1 | 12/2003 |
| EP | 1383289 A | 1/2004 |
| EP | 1 401 164 | 3/2004 |
| EP | 1 197 007 | 7/2004 |
| WO | WO 03/026145 | 3/2003 |
| WO | WO 03/079759 | 10/2003 |
| WO | WO 03/081823 | 10/2003 |
| WO | WO 03/088478 | 10/2003 |
| WO | WO 2004/010572 | 1/2004 |
| WO | WO 2004/012366 | 2/2004 |
| WO | WO 2004/023671 | 3/2004 |

OTHER PUBLICATIONS

Bottomley, Gregory E. et al. "A Generalized RAKE Receiver for Interference Suppression." IEEE Journal on Selected Areas in Comminication, vol. 18, No. 8, pp. 1536-1544, Aug. 2000.

Hadinejad-Mahram, Hafez et al. "Performance Evaluation of Advanced Receivers for WCDMA Downlink Detection." The $5^{th}$ International Symposium on Wireless Personal MultiMedia Communications, 2002. Publication Date: Oct. 27-30, 2002, vol. 2, pp. 367-371. ISSN: 1347-6890.

Hadinejad-Mahram, Hafez et al. "A Linear Receiver for WCDMA Downlink Exploiting the Coloration of the Interference." IEEE International Conference on Telecommunications; Tahiti, Papeete, French Polynesia, Feb. 2003.

Kutz, Gideon et al. "On the Performance of a Practical Downlink CDMA Generalized RAKE Receiver." Proceedings of the IEEE Vehicular Technology Conference, Vancouver, Canada, Sep. 24-28, 2002, pp. 1352-1356. ISBN: 0 7803 7467 3.

Kutz, Gideon et al. "Low Complexity Implementation of a Downlink CDMA Generalized RAKE Receiver." Proceedings of the IEEE Vehicular Technology Conference, Vancouver, Canada, Sep. 24-28, 2002, pp. 1357-1361. ISBN: 0 7803 7467 3.

Laot, C. et al. "Low Complexity MMSE Turbo Equalization: A Possible Solution for EDGE." Will appear in IEEE Transactions on Wireless Communications http://perso-iti.enst-bretagne.fr/~laot/.

Perros-Meilhac, Lisa et al. "Blind Identification of Multipath Channels: A Parametric Subspace Approach." IEEE Transactions of Signal Processing, vol. 49, No. 7, pp. 1468-1480, Jul. 2001.

* cited by examiner

METHOD AND APPARATUS FOR SUPPRESSING COMMUNICATION SIGNAL INTERFERENCE

BACKGROUND OF THE INVENTION

The present invention generally relates to wireless communication systems, and particularly relates to interference suppression in wireless communication receivers.

Direct-sequence spread-spectrum modulation is commonly used in CDMA systems (such as W-CDMA, IS-95, and IS-2000). Data to be transmitted via a spread spectrum carrier is mapped into information symbols, and each information symbol is transmitted as a sequence of chips, which gives rise to bandwidth spreading. The sequence of chips used to spread the transmit symbols is referred to as the spreading code.

At the receiver, the received signal is despread using a despreading code, which typically is the conjugate of the spreading code. RAKE receivers represent a traditional approach to demodulating CDMA signals. RAKE receivers capitalize on the multipath propagation that typically exists between the transmitter and the receiver. Multipath propagation of the transmitted signal can lead to time dispersion, which causes multiple resolvable echoes (or rays) of the signal to be received at the receiver. A RAKE receiver aligns different ones of its "fingers" (correlators) with different ones of the signal echoes, and each finger outputs despread values at the symbol rate. These despread values are then weighted by the conjugate of the respective channel coefficient and then summed to produce a soft estimate of the transmitted symbol. This weighting and summing process is commonly referred to as RAKE combining.

Combining multipath echoes in the above manner yields an improved Signal-to-interference Ratio (SIR) when white noise is the dominant received signal impairment term at the receiver. However, RAKE combining is less than optimal when colored noise is the dominant impairment term. Colored noise arises from self-interference (Inter-Symbol Interference or ISI) and Multi-user Access Interference (MAI). As wireless networks crowd more and more users onto the same spectrum, and as the signal data rates increase, colored noise may become more problematic.

Thus, receiver structures capable of colored noise suppression represent an area of increasing interest. Unfortunately, the conventional approaches to interference suppression in colored noise environments entail potentially significant receiver complexity. For the typical portable communication device, such as a cellular radiotelephone, Portable Digital Assistant (PDA) or wireless pager, that complexity adds cost and undesirably affects cost, design time, and battery life.

SUMMARY OF THE INVENTION

The present invention comprises a method and apparatus for calculating whitening filters in communication signal processing applications, such as in wireless communication receivers. As a simplifying construction, a frequency domain representation of a whitening filter is made to depend on essentially one unknown, namely, a scaling factor that is based on an estimated ratio of total base station power to the power spectral density (PSD) of inter-cell interference plus noise. An exemplary method reduces the computational complexity of calculating the scaling factor by computing it based on the modeling terms used in a parametric model of the impairment correlations for a received communication signal. Preferably, the model comprises an interference impairment term scaled by a first model fitting parameter, and a noise impairment term scaled by a second model fitting parameter. Alternatively, the scaling factor can be computed by direct estimation, for example.

Thus, in an exemplary embodiment, the present invention comprises a method of generating a whitening filter for a communication signal transmitted from a wireless communication network base station comprising estimating a ratio of total base station transmit power to the PSD of inter-cell interference plus noise, calculating a scaling factor based on the estimated ratio of total base station transmit power to the PSD of inter-cell interference plus noise, and determining a whitening filter for whitening the communication signal. That whitening filter determination can be a function of the scaling factor, a frequency response associated with a transmit pulse shaping filter used at the base station, and a frequency response of a propagation channel through which the communication signal is received.

With the above basis for filter determination, the whitening filter determination can be made using a stored or calculated value for the transmit pulse shaping filter's frequency response, the medium channel coefficients calculated for the propagation channel, and the scaling factor. Because the filter response can be stored at the receiver based on a priori knowledge and the medium channel coefficient calculation can be made directly from pilot channel measurements, whitening filter determination reduces to the task of scaling factor determination. Basing scaling factor determination on the model fitting parameters of a parametric impairment correlation model offers one method of simplifying determination of the scaling factor. Using individualized signals—i.e., base-station-specific signals—from each of the base stations contributing to the inter-cell interference, if such signals are available, represents another simplified approach to calculating the scaling factor.

In a circuit embodiment, a receiver circuit is configured to generate a whitening filter for a communication signal transmitted from a wireless communication network base station. The exemplary receiver circuit comprises a calculation circuit configured to calculate a scaling factor based on an estimated ratio of total base station transmit power to the PSD of inter-cell interference plus noise, and a filter circuit configured to determine a whitening filter for whitening the communication signal as a function of the scaling factor, a frequency response associated with a transmit pulse shaping filter used at the base station, and a frequency response of a propagation channel through which the communication signal is received.

In one embodiment, the whitening filter is implemented as a receiver circuit that generates a filtered signal for input to a RAKE receiver. In this manner, colored interference in the communication signal is suppressed in advance of RAKE processing, which then provides multipath channel compensation and RAKE combining. In another embodiment, the whitening filter is implemented as part of a chip equalizer filter that also includes channel compensation filtering. In general, the whitening filter determination can be separate from, or part of, channel compensation filtering. Likewise, whitening filter circuit implementations can be separate from, or part of, channel compensation filter circuits.

Thus, the advantageous whitening filter determination of the present invention may be practiced as part of two-step signal processing method, wherein whitening is applied to a received communication signal, and then channel compensation is applied, or a combined-step method wherein whitening and channel compensation are performed together. Those skilled in the art will appreciate that because such filtering processes are linear, the filtering order for channel compensation and whitening may be reversed as needed or desired.

Of course, the present invention is not limited to the above features and advantages. Those skilled in the art will recognize additional features and advantages of the present invention upon reading the following detailed description and upon viewing the accompanying figures, in which like or similar elements are assigned like reference numbers.

DETAILED DESCRIPTION OF THE INVENTION

Figure 1:
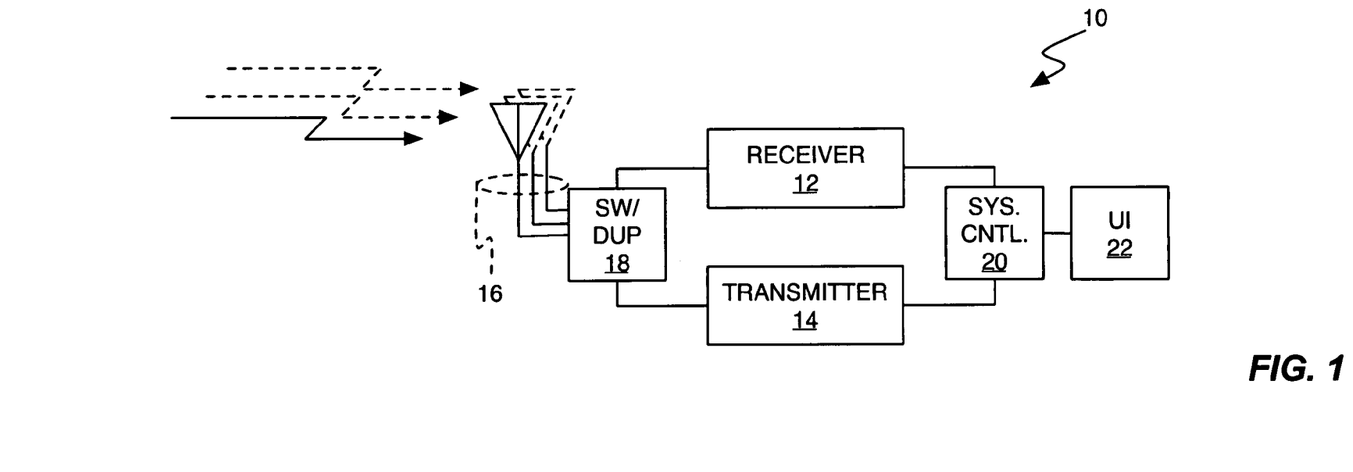
FIG. 1 is a diagram of an exemplary wireless communication device that is configured according to one or more embodiments of the present invention.

The present invention addresses suppression of colored noise, and offers simplified whitening filter generation. By way of non-limiting example, then, the present invention can be implemented to significant advantage in the wireless communication device 10 of FIG. 1. Device 10 comprises a receiver 12, a transmitter 14, one or more antennas 16, a switch/duplexer 18, a system controller 20, and a user interface 22. Those skilled in the art will appreciate that the actual architecture of device 10 can be varied without departing from the scope of the present invention, and that the illustrated architecture provides a non-limiting basis for discussing exemplary receiver operations.

Figure 2:
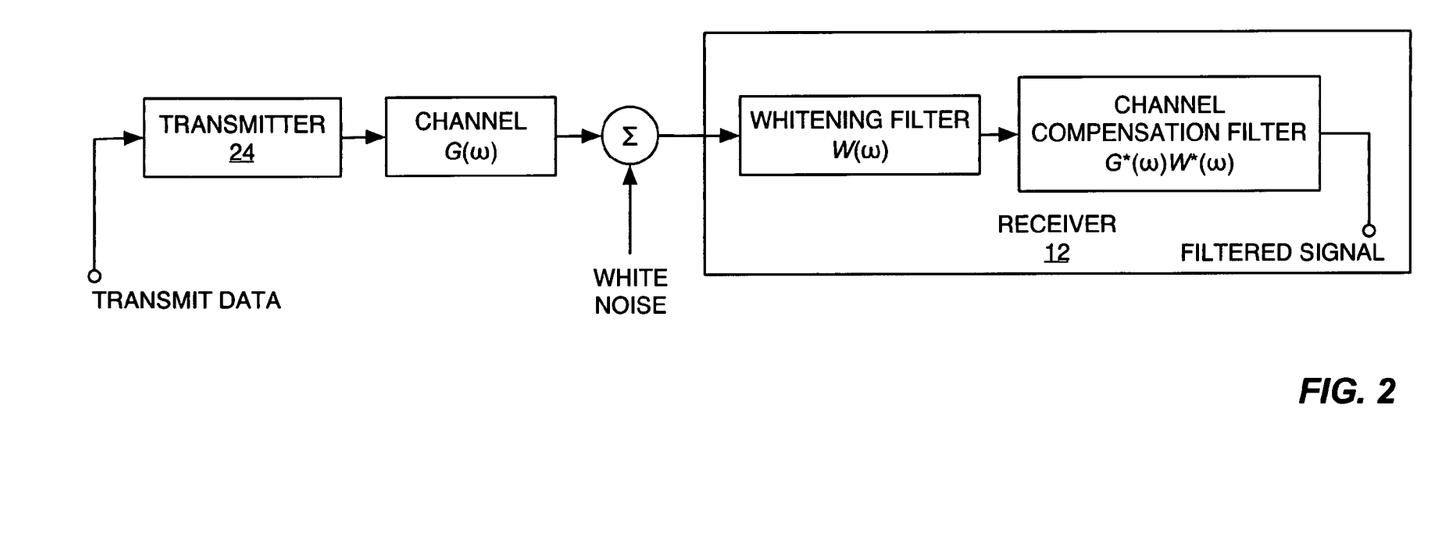
FIG. 2 is a diagram of an exemplary communication signal flow between a remote transmitter and the device receiver depicted in FIG. 1

With that in mind, FIG. 2 illustrates a fundamental signal flow for the wireless transmission of data from a remote transmitter 24 to the receiver 12 of device 10. Transmitter 24 can be, for example, a base station transmitter in a wireless communication network. The received signal, r(t), comprises the transmitted signal, s(t), but with channel distortions caused by propagation through the transmission medium channel, G(ω), and with additive white noise. The medium channel imparts phase and attenuation distortions that generally must be compensated for at the receiver 12 via some form of channel compensation filter that applies the conjugate medium channel, represented as G*(ω), to the received communication signal. However, application of the channel compensation filter leaves the colored noise problem unaddressed. Colored noise in the received signal generally arises in the form of ISI and MAI.

Therefore, FIG. 2 illustrates an optimal conceptual implementation of filtering at receiver 12 that addresses the "matched filter in colored noise" by providing a signal-whitening step followed by a matching step (matching to the composite of the true channel and the whitening filter). The whitening filter, W(ω), compensates the received communication signal for colored noise and the present invention provides an advantageous method and apparatus for determining it in a computationally efficient manner.

Figure 3:
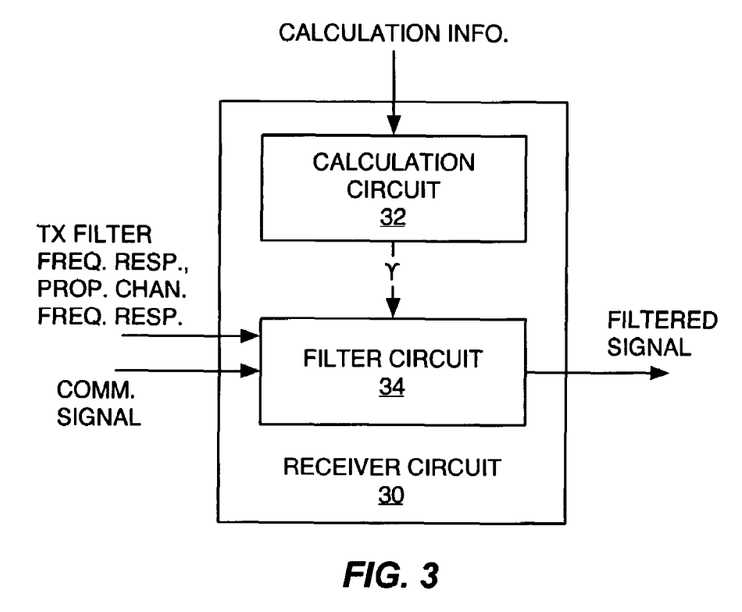
FIG. 3 is a diagram of a receiver circuit for whitening filter determination in accordance with the present invention.

FIG. 3 broadly illustrates an exemplary receiver circuit 30 that is configured to determine a whitening filter according to the present invention, and it may be configured to determine a channel compensation filter, as well. Indeed, the two filters may be determined together in some embodiments as a composite filter. It should be understood that receiver circuit 30 can be implemented as part of the receiver processing circuitry comprising receiver 12 of device 10, and that it can be embodied in hardware, software, or some combination thereof. For example, receiver circuit 30 may be implemented as a computer program comprising stored program instructions for execution by a microprocessor, digital signal processor, or some other digital processor, or the like. Alternatively, receiver circuit 30 may comprise all or part of an Application Specific Integrated Circuit (ASIC), Field Programmable Gate Array (FPGA), Complex Programmable Logic Device (CPLD), or the like.

Regardless, receiver circuit 30 can be implemented as part of the signal processing chain for the communication signal(s) received by receiver 12 of device 10. In particular, receiver circuit 30 can be configured to generate a filtered signal from the received communication signal, wherein the filtered signal serves as the input to a subsequent demodulation processor that demodulates/decodes the filtered signal to recover transmitted data bits, for example.

Figure 4:
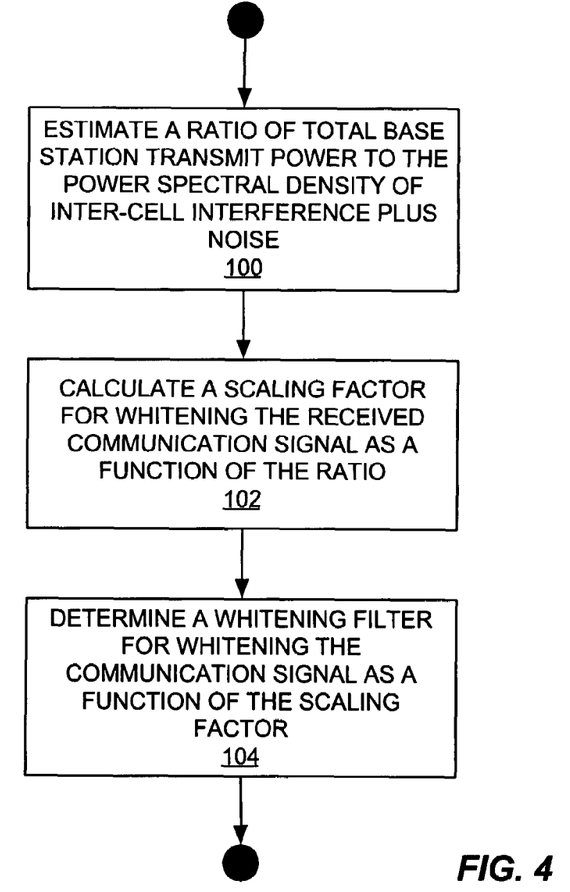
FIG. 4 is a diagram of exemplary processing logic embodying the circuit functionality of FIG. 3.

FIG. 4 broadly illustrates exemplary whitening filter determination. While whitening may be done in either the time or frequency domains, a frequency domain representation of the desired whitening filter serves as the advantageous basis for reducing its calculation essentially to the determination of one unknown. In an exemplary Single-Input-Single-Output (SISO) context, this process is best understood by forming an exemplary composite filter as, $$H(\omega) = \frac{kP^*(\omega)G^*(\omega)}{I_{or}|P(\omega)G(\omega)|^2 + \Phi(\omega)} \tag{1}$$

where P(ω) equals the frequency response of the transmit pulse shaping filter associated with transmission of the received communication signal, P*(ω) equals the conjugate of that frequency response, i.e., it equals the receiver pulse shaping filter's frequency response, G(ω) equals the frequency response of the propagation channel through which the communication signal was received, G*(ω) equals the conjugate of that frequency response, $I_{or}$ equals the total transmit power of the transmitter transmitting the communication signal (e.g., a network base station transmitter in a given cell or other coverage area), Φ(ω) equals the PSD of inter-cell interference plus noise at the receiver 12, and k is an arbitrary real constant.

To cast Eq. (1) in terms of the conceptual optimal receiver filtering structure depicted in FIG. 2, one can rewrite the composite filter H(ω) as the product of the whitening and channel compensation filters:

$$H(\omega) = \tag{2}$$
$$W(\omega)S(\omega) = \left[\frac{1}{\sqrt{I_{or}|G(\omega)P(\omega)|^2 + \Phi(\omega)}}\right]\left[\frac{kP^*(\omega)G^*(\omega)}{\sqrt{I_{or}|G(\omega)P(\omega)|^2 + \Phi(\omega)}}\right]$$

The form shown in Eq. (2) can be manipulated to provide more than one SISO embodiment of the invention, and can be simplified based on the assumption that $P(\omega)$ is known a priori by the receiver 12. That assumption is consistent with the practice of configuring receiver filtering to impart the conjugate response of the transmit pulse shaping filter. Such filter response information can be embodied in a fixed filter structure at the receiver 12, or can be based on filter response information stored at receiver 12 for use in a digital filtering algorithm.

A further assumption with respect to Eq. (2) is the existence of a pilot channel (e.g. common pilot or CPICH in W-CDMA) and a means for estimating channel delays and net channel coefficients at the receiver 12. In other words, from Eq. (2), the frequency responses for the transmit and receiver pulse shaping filters, $P(\omega)$ and $P^*(\omega)$ are known a priori at receiver 12, and the frequency responses for the net propagation channel and its conjugate, $G(\omega)$ and $G^*(\omega)$, can be calculated directly from the pilot channel estimates. That leaves as unknowns the total transmit power $I_{or}$ and the PSD of the inter-cell interference plus noise, $\Phi(\omega)$.

With the substitution $$\gamma = \frac{I_{or}}{\Phi(\omega)},$$

the whitening filter representation is $$W(\omega) = \frac{1}{\sqrt{\gamma |G(\omega)P(\omega)|^2 + 1}}, \quad (3)$$

where $\gamma$ may be viewed as a frequency domain scaling factor for the whitening filter expression. Thus, whitening filter determination reduces to the determination of the $\gamma$ as the ratio of $I_{or}$ to $\Phi(\omega)$.

FIG. 4 illustrates exemplary processing logic for determining the whitening filter, $W(\omega)$, or the time-domain embodiment of it, $w(t)$, based on the scaling factor $\gamma$. Exemplary processing begins with estimating $I_{or}$ and $\Phi(\omega)$ (Step 100). From there, processing continues with the calculation of $\gamma$ based on a ratio of the estimates for $I_{or}$ and $\Phi(\omega)$ (Step 102). With the scaling factor $\gamma$ thus determined, and with the transmit filter's frequency response known (or calculated), and with estimation of the medium channel's frequency response, the whitening filter can be determined according to Eq. (3) (Step 104).

Figure 5:
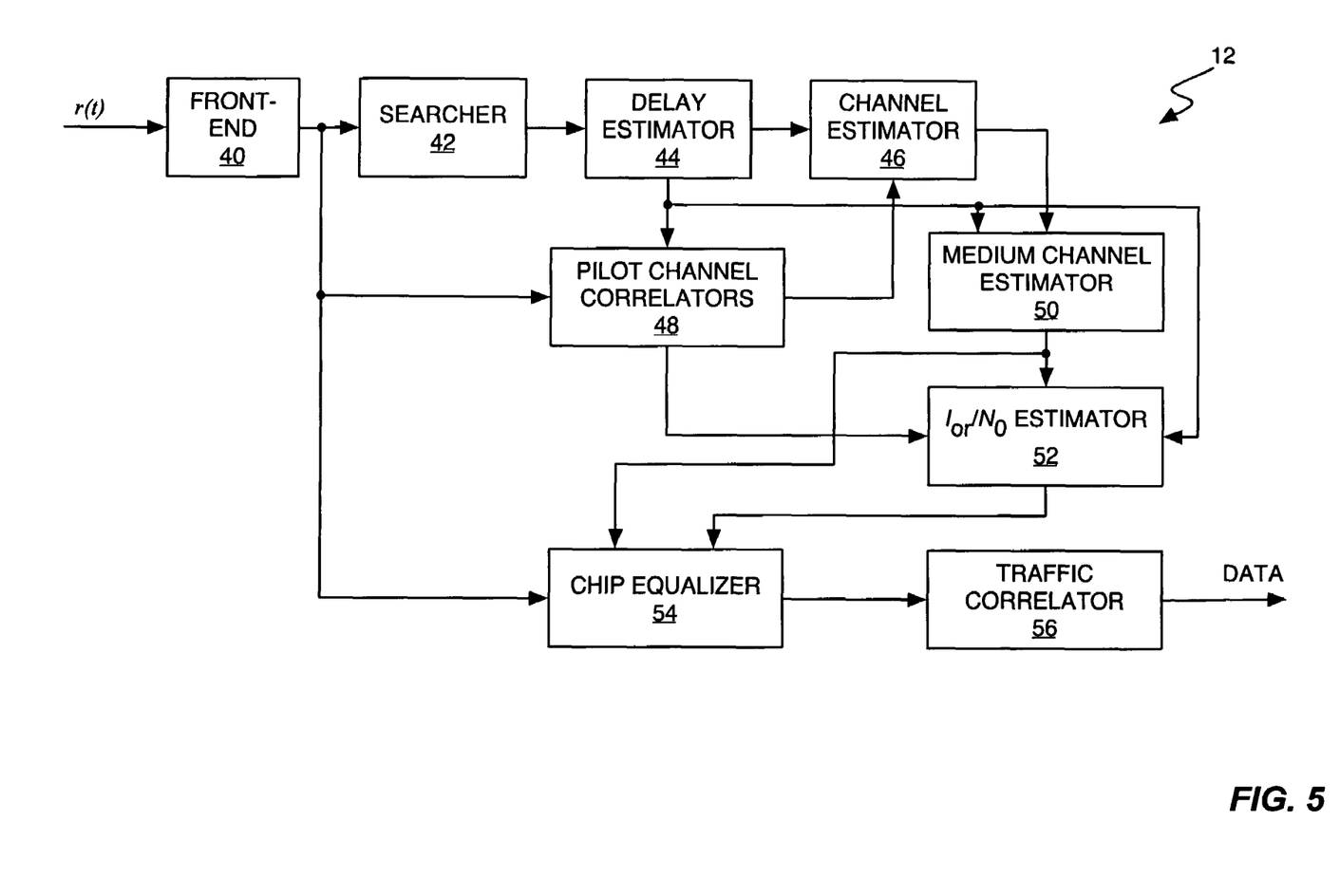
FIG. 5 is a diagram of an exemplary RAKE-based receiver in accordance with the present invention.

The above exemplary processing can be applied in the context of specific receiver structures. For example, FIG. 5 illustrates an exemplary chip-equalization embodiment of receiver 12. In this embodiment, receiver 12 comprises a receiver front-end 40, a searcher 42, a delay estimator 44, a channel estimator 46, pilot channel correlators 48, a medium channel estimator 50, a ratio estimator 52 to estimate the ratio of $I_{or}/\Phi(\omega)$, a chip equalizer 54, and a traffic correlator 56.

The chip-equalization filter implemented by chip equalizer 54 can be derived by rewriting Eq. (2) as $$H(\omega) = P^*(\omega)H'(\omega) = P^*(\omega)\left[\frac{kG^*(\omega)}{I_{or}|P(\omega)G(\omega)|^2 + \Phi(\omega)}\right]. \quad (4)$$

Recognizing that $P^*(\omega)$ represents the receive pulse shaping filter in the received signal processing path of receiver 12, a primary task for this embodiment lies in the determination of $H'(\omega)$. By modeling the other-cell interference plus noise term as a white Gaussian noise process with one-sided spectral density of $N_0$, $H'(\omega)$ can be rewritten as $$H'(\omega) = \frac{kG^*(\omega)}{\gamma|P(\omega)G(\omega)|^2 + 1}, \quad (5)$$

where $\gamma$ is now a real scale factor, and is equal to $$\frac{I_{or}}{N_0}.$$

The magnitude of the scale factor k does not affect the optimality of the final chip equalizer and is therefore assigned an arbitrary value (e.g., 1). Thus, the main estimation task for the chip equalizer embodiment is to compute $G(\omega)$ and $\gamma$.

Considering the computation of $G(\omega)$ first, and per the above pilot channel assumptions, the receiver 12 estimates the channel delays and the net channel coefficients, which include the transmit/receive signal processing effects, as well as the medium (propagation) channel effects. Given L channel delays in a multipath propagation channel, the medium channel coefficients can be obtained from the net channel coefficients via $$c(\tau_0) = \sqrt{E_{CPICH}} \sum_{j=0}^{L-1} g_j R_p(\tau_0 - \tau_j), \quad (6)$$

$$c(\tau_1) = \sqrt{E_{CPICH}} \sum_{j=0}^{L-1} g_j R_p(\tau_1 - \tau_j), \text{ and}$$

$$\vdots$$

$$c(\tau_{L-1}) = \sqrt{E_{CPICH}} \sum_{j=0}^{L-1} g_j R_p(\tau_{L-1} - \tau_j),$$

where $\tau_i$ is the ith channel delay indicated by the delay searcher, $E_{CPICH}$ equals an energy measurement of a common pilot channel (CPICH), $g_j$ equals the jth medium coefficient, $c(\tau_k)$ is the net channel coefficient at delay $\tau_k$ and $R_p(\tau)$ represents the pulse shape correlation function given as $$\int_{-\infty}^{\infty} p(t+\tau)p^*(\tau)d\tau.$$

Eq. (6) can be rewritten in vector-matrix notation by absorbing the constant factor of $E_{CPICH}$ into the medium channel coefficient as $$R_p\tilde{g}=c. \quad (7)$$

Eq. (7) can be solved by direct matrix inversion or by application of an iterative technique, such as Gauss-Seidel. The solution yields medium channel coefficients at the path delays. A fast Fourier transform (FFT) can then be applied to the time domain medium coefficients to obtain the frequency response $G(\omega)$ of the medium channel. Thus, one or more FFT circuits can be included as part of receiver 12.

In considering the calculation of the scaling factor γ, receiver 12 can be configured to use a pilot channel-based estimation technique that is based on a parametric model of the received communication signal's impairment correlations. An exemplary parametric model is disclosed in the co-pending patent application, which is assigned Ser. No. 10/800,167, and which was filed on Mar. 12, 2004. That application is incorporated in its entirety herein by reference.

While the above-identified application includes additional background and explanatory details, an exemplary parametric model of communication signal impairment correlations includes one or more impairment terms, each scaled by a model fitting parameter. The model fitting parameters are then updated on a recurring basis as part of an ongoing fitting process wherein the model is fitted to impairment correlation estimates. In more detail, an exemplary parametric model can be expressed as $$\tilde{R} = \alpha R_I + \beta R_N, \quad (8)$$

where $R_I$ represents an interference correlation term (matrix) scaled by the first model fitting parameter α and $R_N$ represents a noise correlation term (matrix) scaled by the second model fitting parameter β. The model fitting parameters are adapted during a fitting process—e.g., during a Least Squares (LS) fitting process, wherein the model fitting parameters are adapted to minimize the model error.

It can be shown that $\alpha = 1/(E_c/I_{or})_{CPICH}$, where $(E_c/I_{or})_{CPICH}$ represents the fraction of the base station energy given to the common pilot channel, and $\beta = N_0$. Thus, given an estimate of the pilot channel power and the values α and β, the parameter γ can be determined from $$\gamma = \frac{E\{\tilde{g}^H \tilde{g}\}\alpha}{\beta}, \quad (9)$$

where $E\{*\}$ represents statistical expectation, and $\tilde{g}$ represents a scaled medium coefficient estimate. A statistical approximation can be used to solve the estimation problem for γ. An exemplary method is given as $$E\{\tilde{g}^H \tilde{g}\} = I_{CPICH}(n) = \lambda I_{CPICH}(n-1) + (1-\lambda)\tilde{g}^H \tilde{g}. \quad (10)$$

In the above expression, $I_{CPICH}(n)$ is the pilot channel power at time index n (some multiple of the pilot symbol rate) and λ is a value between 0 and 1.

With the above in mind, then, the receiver embodiment illustrated in FIG. 5 may be configured such that is operative to carry out whitening filter generation in accordance with the present invention based on a number of exemplary processing steps. Those steps include these items:

- estimate channel delays by using searcher 42 and delay estimator 44;
- estimate net channel coefficients via channel estimator 46;
- estimate the scaled version of medium coefficients using equations (6) and (7) as implemented in medium channel estimator 50;
- estimate α and β using parametric modeling of received signal impairment correlations in receiver circuit 30, an embodiment of which may be implemented as part of chip equalizer 54;
- compute medium coefficients as $g = \alpha \tilde{g}$ in chip equalizer 54;
- compute FFT of g to get G(ω), which may be done in chip equalizer 54;
- compute γ from Eqs. (9) and (10), which may be done in chip equalizer 54; and
- compute chip equalizer filter from Eq. (5), which may be done in chip equalizer 54.

Note that chip equalizer may include one or more processing circuits configured to carry out the above whitening/composite filter calculations. Further, note that the final filter obtained from the last step can be implemented in either the time or frequency domain, and received communication signal filtering as described herein can be carried out in either the time domain, or the frequency domain.

In any case, the single traffic correlator 56 operates on the filtered (whitened and channel equalized) signal output by chip equalizer 54. More particularly, traffic correlator 56 computes estimates of the transmitted symbols contained in the received communication signal, r', which is input to the chip equalizer 54 from the receiver front-end 40. As such, receiver front-end 40 can include low-noise amplifiers, filters, analog-to-digital-converters, and other circuits as needed or desired to produce a digital samples representing the received communication signal.

The present invention also can be implemented in an "over-whitening plus RAKE" embodiment, wherein an over-whitening filter provides a filtered version of the received communication signal for subsequent processing by a RAKE receiver. The over-whitening filter suppresses colored noise from the received communication signal before RAKE processing, thus improving the performance of RAKE combining.

In support of this RAKE-based embodiment of the present invention, Eq. (2) can be rewritten as $$H(\omega) = P^*(\omega)\hat{W}(\omega)G^*(\omega) = P^*(\omega)\left[\frac{k}{I_{or}|P(\omega)G(\omega)|^2 + \Phi(\omega)}\right]G^*(\omega). \quad (11)$$

Again, $P^*(\omega)$ represents the receive pulse shape filter, and $G^*(\omega)$ represents channel compensation as implemented in the RAKE receiver circuit. Thus, as with the chip equalization embodiment of FIG. 5, the primary effort for this embodiment lies in the determination of $\hat{W}(\omega)$. As before, by modeling the inter-cell interference plus noise term as a white Gaussian noise process with one-sided spectral density of $N_0$, the whitening filter $\hat{W}(\omega)$ can be rewritten as $$W(\omega) = \frac{\frac{k}{N_0}}{\gamma|P(\omega)G(\omega)|^2 + 1} = \frac{\hat{k}}{\gamma|P(\omega)G(\omega)|^2 + 1}. \quad (12)$$

Figure 6:
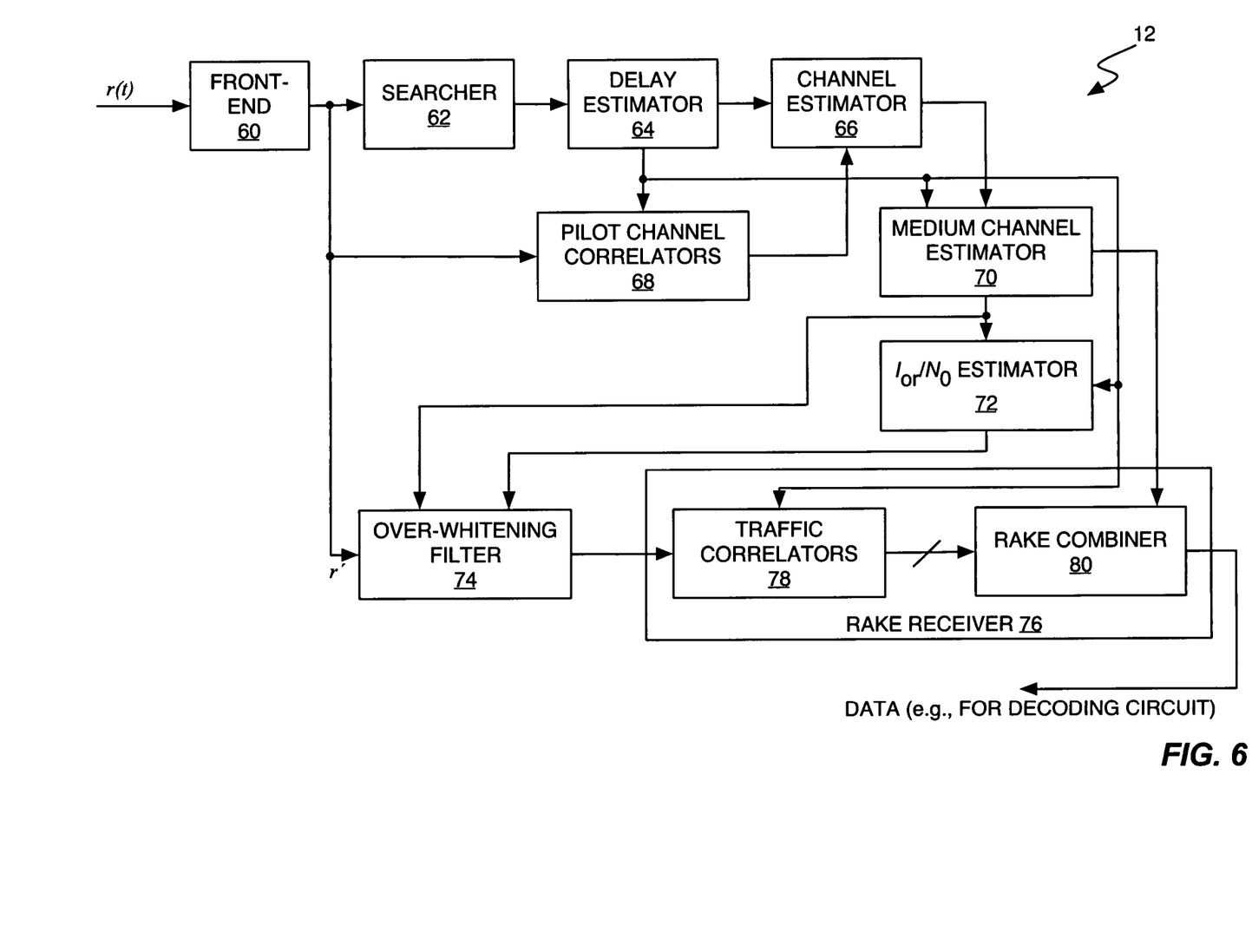
FIG. 6 is a diagram of an exemplary chip equalizer-based receiver in accordance with the present invention.

The scale factor $\hat{k}$ in the numerator does not affect the optimality of the final result, so it can be assigned a convenient value, such as "1." The same methods for computing G(ω) and γ described above can be used here, and may be implemented in an exemplary RAKE-based embodiment of receiver 12, such as illustrated in FIG. 6.

As shown in FIG. 6, receiver 12 comprises a receiver front-end circuit 60, a searcher 62, a delay estimator 64, a channel estimator 66, pilot channel correlators 68, a medium channel estimator 70, a ratio estimator 72 to estimate $$\frac{I_{or}}{N_0},$$

an over-whitening filter 74, and a RAKE receiver circuit 76, including a plurality of traffic correlators ("fingers") 78, and a RAKE combining circuit 80. Note that the over-whitening filter 74 can be configured to include some or all of the functionality of the earlier-depicted receiver circuit 30, and thus is adapted to carry out whitening filter determination.

That determination can be carried out according to an overall processing method similar to that described for the chip equalization embodiment. Specifically, an exemplary receiver processing method in the RAKE-based embodiment comprises these steps:

estimate channel delays by using searcher 62 and delay estimator 64;

estimate net channel coefficients via channel estimator 66;

estimate the scaled version of medium coefficients using equations (6) and (7) as implemented in medium channel estimator 70;

estimate α and β using parametric modeling of received signal impairment correlations in receiver circuit 30, an embodiment of which may be implemented as part of over-whitening filter 74;

compute medium coefficients as g=α$\tilde{g}$ in over-whitening filter 74;

compute FFT of g to get G(ω), which may be done in over-whitening filter 74;

compute γ from Eqs. (9) and (10), which may be done in over-whitening filter 74; and compute over-whitening filter from Eq. (12)—note that the final filter can be implemented in either the time or frequency domain; and RAKE combine over-whitened communication signal to compute estimates of the transmitted symbols within the received communication signal—i.e., despread the over-whitened signal in each of one or more fingers 78 according to multipath delays, and combine the finger outputs to form a RAKE-combined signal for subsequent demodulation processing.

Figure 7:
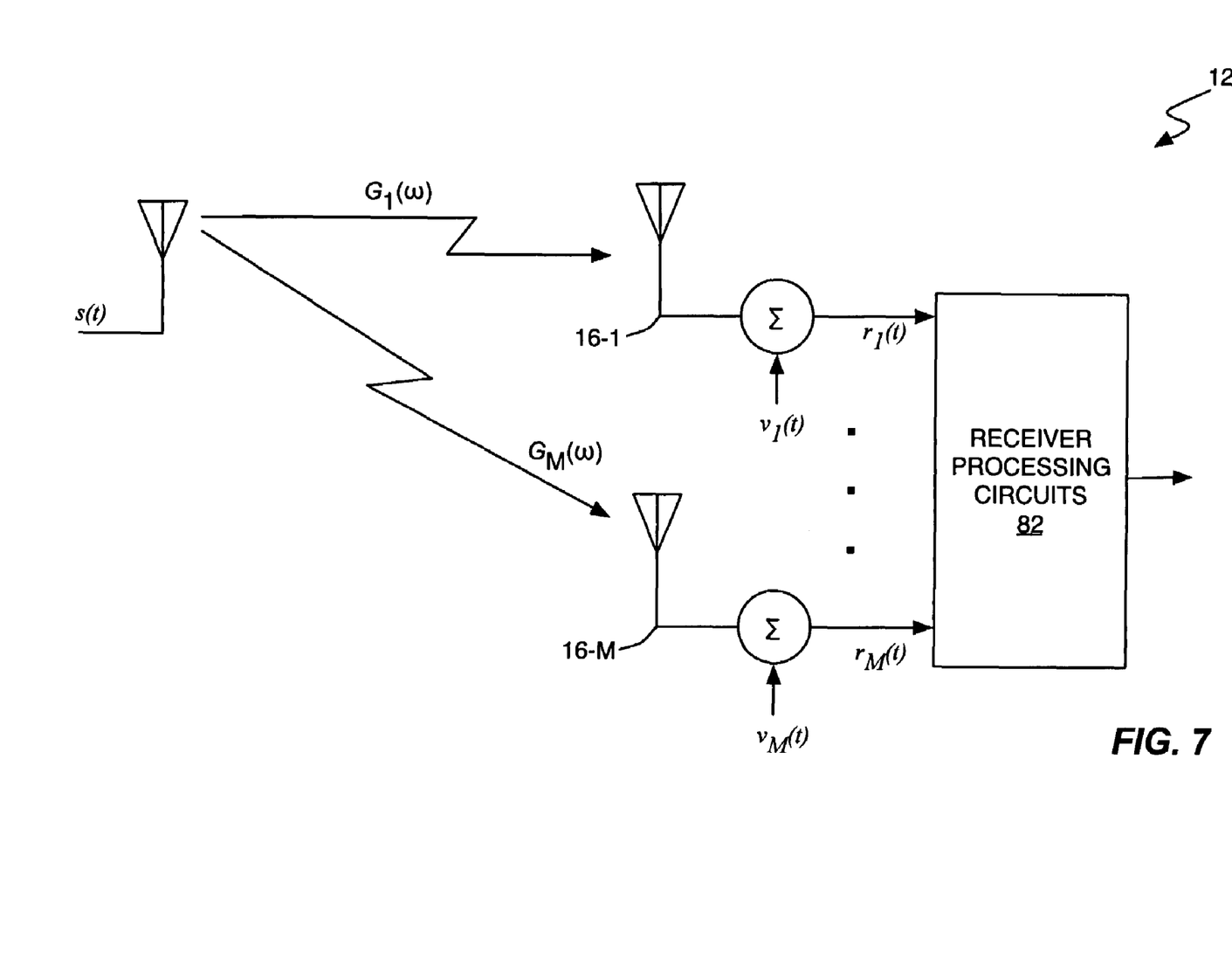
FIG. 7 is a diagram of a Single-Input-Multiple-Output (SIMO) receiver embodiment in accordance with the present invention.

While the above RAKE-based embodiment, and the earlier described chip-equalization embodiment, represent exemplary SISO embodiments of the present invention, the present invention can be readily extended to Single-Input-Multiple-Output (SIMO) embodiments. FIG. 7 illustrates an exemplary SIMO embodiment, wherein receiver 12 of device 10 includes M receive antennas (16-1 through 16-M), and the kth antenna receives $s_k(t)$. The antennas 16 are coupled to one or more receiver processing circuits 82, which may be configured to implement an embodiment of the earlier illustrated receiver circuit 30 for whitening filter determination.

In operation, each antenna 16-k receives signal $s_k(t)$, which is obtained by passing the data signal s(t) through propagation channel k. The impulse response of the propagation channel from the base station (BTS) transmitter to the kth receive antenna at receiver 12 is denoted by $g_k(t)$ with Fourier transform $G_k(\omega)$. Therefore, the noise-free signal at the kth antenna is given by $$s_k(t)=s(t)*g_k(t), \quad (13)$$

where * denotes convolution. Considering Eq. (13), the total received signal at the kth antenna can be expressed as $$r_k(t)=s_k(t)+v_k(t). \quad (14)$$

Here, $v_k(t)$ is a noise that models inter-cell interference and thermal noise at the kth antenna.

It can be shown that a decision statistic for detecting data symbols has the form $$Y(t) = \sum_{k=1}^{M} \int h(t-t',k)y_k(t')dt', \quad (15)$$

where $y_k(t)$ is the signal at the kth antenna after despreading the received signal $r_k(t)$, and where h(t,k) is the impulse response of the linear filter with frequency response $$H(\omega) = \frac{kP^*(\omega)G_k^*(\omega)}{I_{or}|P(\omega)|^2 \sum_{k=1}^{M}|G_k(\omega)|^2 + \Phi(\omega)}. \quad (16)$$

Noting that Eq. (15) essentially describes a receiver with M parallel sub-channels, it is advantageous to rewrite (16) in the form $$H(\omega,k)=P^*(\omega)G_k^*(\omega)\hat{W}(\omega), \quad (17)$$

where $$\hat{W}(\omega) = \frac{k}{I_{or}|P(\omega)|^2 \sum_{k=1}^{M}|G_k(\omega)|^2 + \Phi(\omega)}. \quad (18)$$

Figure 8:
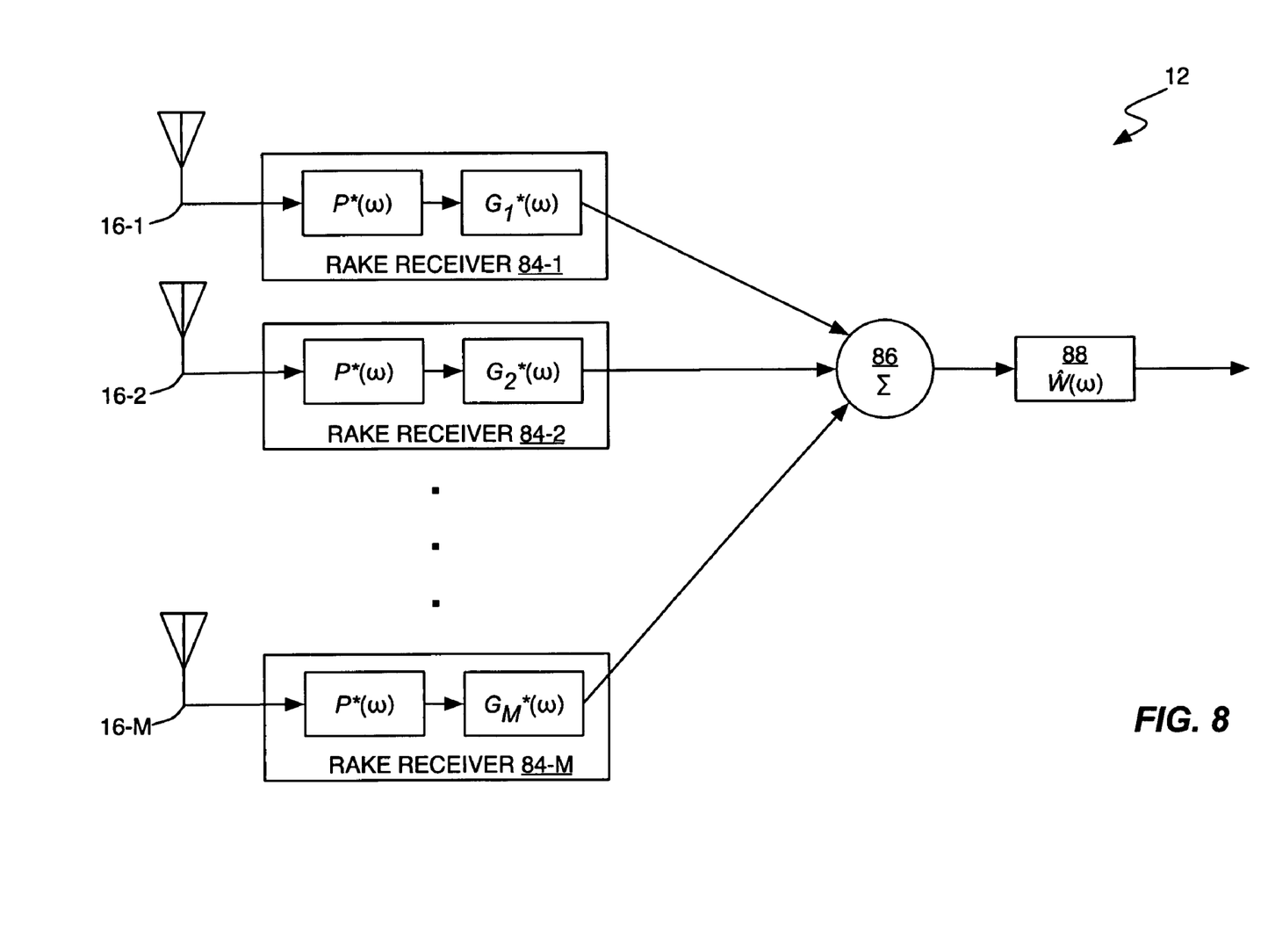
FIG. 8 is a diagram of exemplary receiver details for the receiver of FIG. 7.

One can observe that the over-whitening filter in the above SIMO embodiment is common across antennas 16, and the receiver structure illustrated in FIG. 8 represents an exemplary capitalization on that commonality. In FIG. 8, receiver 12 is implemented as a beamformer comprising a RAKE receiver circuit 84-k for each antenna 16-k, each circuit 84-k including a pulse shaping filter $P^*(\omega)$ and a channel compensation filter $G_k^*(\omega)$, a RAKE combining circuit 86 for additively combining the antenna streams (the RAKE outputs), and an over-whitening filter circuit 88 for over-whitening the RAKE combined signal output from combiner circuit 86 by applying the over-whitening filter $\hat{W}(\omega)$.

It should be noted that the RAKE receiver circuits 84 can include, or can be associated with, one or more FFT circuits for converting the received communication signal to a frequency domain for processing, or the above filters can be transformed into the time domain for application to the time-domain received communication. Likewise, the over-whitening filter implemented by circuit 88 can be determined based on the exemplary frequency domain processing described herein, but applied to the received communication signal in either the time or frequency domain.

Further, because of the linear nature of the described processing, over-whitening could be performed in advance of each RAKE receiver circuit 84-1—i.e., the filtering order could be swapped. While swapping the order might require replication of the over-whitening filter in each RAKE processing path, such an arrangement may be advantageous in some design implementations. For example, if the over-whitening-plus-RAKE embodiment of FIG. 6 is implemented in modular integrated-circuit form, e.g., for ASIC/FPGA implementation, that basic module could be replicated as many times as needed for a given SIMO receiver implementation.

For the illustrated SIMO embodiment, the other-cell interference plus noise PSD term again can be modeled as a white Gaussian noise process with one-sided spectral density of $N_0$. Using this model, Eq. (18) can be rewritten in the form $$\hat{W}(\omega) = \frac{\hat{k}}{\gamma|P(\omega)|^2 \sum_{k=1}^{M}|G_k(\omega)|^2 + 1}. \quad (19)$$

As with the SISO embodiments, the scale factor in the numerator does not affect the optimality of the final result, so it can be assigned a value of 1, for example. Again, then, the primary computational task for whitening filter determination lies with calculation of the scaling factor γ (and with the computation of $G_k(\omega)$ on which γ depends).

An exemplary processing method for whitening filter determination in the SIMO embodiment is similar to the SISO method(s) described earlier. Such processing includes these steps:

For each antenna 16-$k$:
  Estimate channel delays;
  Estimate net channel coefficients;
  Estimate scaled version of medium coefficients using Eqs. (6) and (7);
  Estimate $\alpha_k$ and $\beta_k$ using parametric modeling (or using direct estimation);
  Compute medium coefficients as $g_k = \alpha \tilde{g}_k$;
  Compute FFT of $g_k$ to get $G_k(\omega)$;
  Rake combine traffic data;
  Compute $\gamma_k$ from equations (9) and (10);
Compute final estimate of $\gamma$ as the arithmetic mean of the $\gamma_k$, or by selecting one of the $\gamma_k$;
Compute the over-whitening filter from Eq. (19)—note that the final filter can be implemented in either the time or frequency domain; and
Filter the combined signal with over-whitening filter to compute estimates of transmitted symbols contained in the received communication signal.

Thus, the receiver processing steps for the exemplary SIMO embodiment are similar to the processing steps for the exemplary SISO embodiments (RAKE, chip equalizer), with the exception that some of the processing is done on a per-antenna basis for SIMO. Regardless, those skilled in the art should appreciate that the present invention provides an advantageous basis for whitening filter computation based on a frequency domain representation of the whitening filter that reduces essentially to one unknown, namely, a scaling factor that depends on an estimate of the ratio of total transmitter power, $I_{or}$, to the PSD of other-cell interference plus noise, $\Phi(\omega)$.

While that ratio can be estimated using the model fitting parameters from a parametric model of received signal impairment correlations as described herein, it also can be directly estimated from a direct estimate of total transmit power, and from a direct estimate of the inter-cell interference plus noise. The direct estimate of total transmit power can be based on a value received from the base station, or estimated from the pilot power, or based on some configured value. The direct estimate of inter-cell interference plus noise can be based on signal measurements, such as where each base station is configured to transmit an individualized signal, much like a training sequence burst, or other identifying data pattern, from which the device 10 can generate inter-cell interference measurements based on receiving such signals from each of one or more neighboring base station transmitters.

However, regardless of whether the ratio used for calculation of the scaling factor $\gamma$ is indirectly estimated based on parametric modeling, the present invention provides many advantages with respect to its method of whitening filter determination. For example, the chip equalizer embodiment of FIG. 5, and the RAKE receiver embodiment of FIG. 6 can be generally considered as "RAKE plus filter" implementations that can be cleanly realized in modular chip set-type integrated circuit structures, or embodied as synthesizable library modules for use in chip design software. For example, a basic chipset would include a RAKE receiver circuit, and a higher-performance embodiment would add the over-whitening filter function. Since the over-whitening filter function can be implemented in hardware or software, or some combination thereof, the present invention provides system designers with significant design flexibility.

It should be understood, then, that the present invention broadly provides a method and apparatus for whitening filter determination in the context of received communication signal processing. While the present invention can be implemented in conjunction with RAKE receiver structures and chip equalization receiver structures, it is not limited to those embodiments, nor is it limited to SISO or SIMO systems, as it has broad applicability across a range of receiver types and system arrangements. Thus, the present invention is not limited by the foregoing discussion, nor by the accompanying figures, but rather is limited only by the following claims and their reasonable legal equivalents.

What is claimed is:

1. A method of generating a whitening filter for a communication signal transmitted from a wireless communication network base station, the method comprising:
    estimating a ratio of total base station transmit power to the power spectral density of inter-cell interference plus noise;
    calculating a scaling factor based on the estimated ratio of total base station transmit power to the power spectral density of inter-cell interference plus noise; and
    determining a whitening filter for whitening the communication signal as a function of the scaling factor, a frequency response associated with a transmit pulse shaping filter used at the base station, and a frequency response of a propagation channel through which the communication signal is received.

2. The method of claim 1, wherein estimating the ratio of total base station transmit power to the power spectral density of inter-cell interference plus noise comprises maintaining a parametric model of communication signal impairment correlations based on fitting the model to measured impairment correlations, and calculating the scaling factor from model fitting parameters of the parametric model.

3. The method of claim 2, wherein the model comprises an interference impairment correlation term scaled by a first model fitting parameter and a noise impairment correlation term scaled by a second model fitting parameter, and wherein calculating the scaling factor comprises applying a ratio of the first and second model fitting parameters to an estimate of pilot channel power.

4. The method of claim 1, further comprising pre-storing the frequency response associated with the transmit pulse shaping filter as a known value.

5. The method of claim 1, further comprising calculating the frequency response of the propagation channel based on pilot channel estimates.

6. The method of claim 5, wherein calculating the frequency response of the propagation channel based on pilot channel estimates comprises using pilot channel estimates to determine medium channel coefficients for the propagation channel, and calculating the frequency response of the propagation channel based on the medium channel coefficients.

7. The method of claim 1, wherein estimating a ratio of total base station transmit power to the power spectral density of inter-cell interference plus noise comprises directly estimating the total base station transmit power, directly estimating the power spectral density of inter-cell interference plus noise, and calculating a ratio of the two direct estimates.

8. The method of claim 1, wherein the whitening filter comprises an over-whitening filter, and further generating a RAKE combined signal based on processing the communication signal in a RAKE receiver circuit, and then applying the over-whitening filter to the RAKE combined signal to obtain a filtered signal for decoding.

9. The method of claim 8, further comprising receiving the communication signal as two or more communication signals on two or more receiver antennas, generating a RAKE-combined signal for each receiver antenna, and applying an over-whitening filter to the communication signal received on each receiver antenna, or to a combination of the RAKE-combined signals obtained from each receiver antenna.

10. The method of claim 1, wherein the whitening filter comprises an over-whitening filter, and further comprising applying the over-whitening filter to the communication signal to obtain a filtered signal, and then inputting the filtered signal to a RAKE receiver circuit to obtain a RAKE combined signal for decoding.

11. The method of claim 1, wherein determining the whitening filter for whitening the communication signal comprises determining a chip equalization filter for whitening and equalizing the communication signal.

12. The method of claim 11, further comprising applying the chip equalization filter to the communication signal to obtain a filtered signal, and then inputting the filtered signal to a correlator circuit to obtain a data signal for decoding.

13. A receiver circuit configured to generate a whitening filter for a communication signal transmitted from a wireless communication network base station, the receiver circuit comprising:
    a calculation circuit configured to calculate a scaling factor based on an estimated ratio of total base station transmit power to the power spectral density of inter-cell interference plus noise; and
    a filter circuit configured to determine a whitening filter for whitening the communication signal as a function of the scaling factor, a frequency response associated with a transmit pulse shaping filter used at the base station, and a frequency response of a propagation channel through which the communication signal is received.

14. The receiver circuit of claim 13, further comprising an estimation circuit configured to estimate the ratio of total base station transmit power to the power spectral density of inter-cell interference plus noise by maintaining a parametric model of communication signal impairment correlations based on fitting the model to measured impairment correlations, and wherein the calculation circuit is configured to calculate the scaling factor from model fitting parameters of the parametric model.

15. The receiver circuit of claim 14, wherein the model comprises an interference impairment correlation term scaled by a first model fitting parameter and a noise impairment correlation term scaled by a second model fitting parameter, and wherein the calculation circuit calculates the scaling factor by applying a ratio of the first and second model fitting parameters to an estimate of pilot channel power.

16. The receiver circuit of claim 13, wherein the receiver circuit is configured to access one or more stored values defining a known frequency response of the transmit pulse shaping filter.

17. The receiver circuit of claim 13, wherein the receiver circuit is configured to calculate the frequency response of the propagation channel based on pilot channel estimates.

18. The receiver circuit of claim 17, wherein the receiver circuit is configured to use pilot channel estimates to determine medium channel coefficients for the propagation channel, and to calculate the frequency response of the propagation channel based on the medium channel coefficients.

19. The receiver circuit of claim 13, wherein the receiver circuit is configured to estimate the ratio of total base station transmit power to the power spectral density of inter-cell interference plus by directly estimating the total base station transmit power, directly estimating the power spectral density of inter-cell interference plus noise, and calculating a ratio of the two direct estimates.

20. The receiver circuit of claim 13, wherein the whitening filter comprises an over-whitening filter, and further comprising a RAKE receiver that is configured to generate a RAKE combined signal based on RAKE processing the communication signal, and wherein the receiver circuit is configured to apply the over-whitening filter to the RAKE combined signal to obtain a filtered signal for decoding.

21. The receiver circuit of claim 13, further comprising two or more receiver antennas configured to provide received signals to the receiver circuit.

22. The receiver circuit of claim 13, wherein the whitening filter comprises an over-whitening filter, and wherein the receiver circuit is configured to apply the over-whitening filter to the communication signal to obtain a filtered signal.

23. The receiver circuit of claim 22, further comprising a RAKE receiver that is configured to obtain a RAKE-combined signal from the filtered signal for decoding.

24. The receiver circuit of claim 13, wherein the filter circuit comprises part of a chip equalization filter, and wherein the receiver circuit is configured to apply the chip equalization filter to the communication signal to obtain a filtered signal for decoding.

25. The receiver circuit of claim 13, further comprising a searcher to identify multipath components of the communication signal, a delay estimator to estimate corresponding multipath propagation delays, a channel estimator to estimate net propagation channel responses, and a medium channel estimator to estimate medium propagation channel responses.

26. A Wideband Code Division Multiple Access (W-CDMA) receiver including a receiver circuit configured to generate a whitening filter for a communication signal transmitted from a base station in a W-CDMA network, the receiver circuit comprising:
    a calculation circuit configured to calculate a scaling factor based on an estimated ratio of total base station transmit power to the power spectral density of inter-cell interference plus noise; and
    a filter circuit configured to determine a whitening filter for whitening the communication signal as a function of the scaling factor, a frequency response associated with a transmit pulse shaping filter used at the base station, and a frequency response of a propagation channel through which the communication signal is received.

27. A computer readable medium storing a computer program for generating a whitening filter to whiten a communication signal transmitted from a wireless communication network base station, the computer program comprising:
    program instructions to estimate a ratio of total base station transmit power to the power spectral density of inter-cell interference plus noise;
    program instructions to calculate a scaling factor based on the estimated ratio of total base station transmit power to the power spectral density of inter-cell interference plus noise; and
    program instructions to determine a whitening filter for whitening the communication signal as a function of the scaling factor, a frequency response associated with a transmit pulse shaping filter used at the base station, and a frequency response of a propagation channel through which the communication signal is received.

* * * * *